United States Patent [19]
Eames et al.

[11] Patent Number: 5,420,881
[45] Date of Patent: May 30, 1995

[54] DYE STORAGE AND INTRODUCTION SYSTEM FOR CHANGING THE FREQUENCY OF A DYE LASER

[75] Inventors: Robert E. Eames; David W. Allemeier, both of Orlando, Fla.

[73] Assignee: Martin Marietta Corporation, Bethesda, Md.

[21] Appl. No.: 114,068

[22] Filed: Aug. 31, 1993

[51] Int. Cl.6 .................................. H01S 3/20
[52] U.S. Cl. ........................................ 372/53
[58] Field of Search ............................ 372/53, 54

[56] References Cited

U.S. PATENT DOCUMENTS

| | | |
|---|---|---|
| 3,745,484 | 7/1973 | Caristi . |
| 3,832,649 | 8/1974 | Feightner ........................ 372/54 |
| 3,846,715 | 11/1974 | Yarborough . |
| 3,868,591 | 2/1975 | Mumola et al. . |
| 4,404,679 | 9/1983 | Chiu et al. . |
| 4,710,937 | 12/1987 | Oomori et al. . |
| 4,977,571 | 12/1990 | Furumoto et al. ................ 372/54 |
| 5,087,388 | 2/1992 | Mahoney et al. . |
| 5,109,387 | 4/1992 | Garden et al. . |

*Primary Examiner*—Leon Scott, Jr.
*Attorney, Agent, or Firm*—Burns, Doane, Swecker & Mathis

[57] ABSTRACT

A dye laser having a changeable output frequency includes a system for storing, selecting and introducing a dye into a liquid lasing medium. Dyes are contained in individual glass ampules arranged on a wheel stored in the fluid reservoir. A stepper motor rotates the wheel to select an ampule and a striker solenoid breaks the ampule open to release the dye into solution. A scrubber system removes dye from the liquid to allow the dye to be changed.

24 Claims, 3 Drawing Sheets

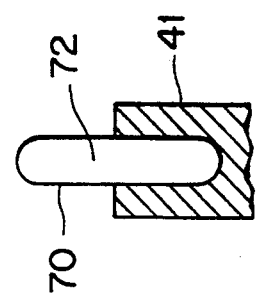
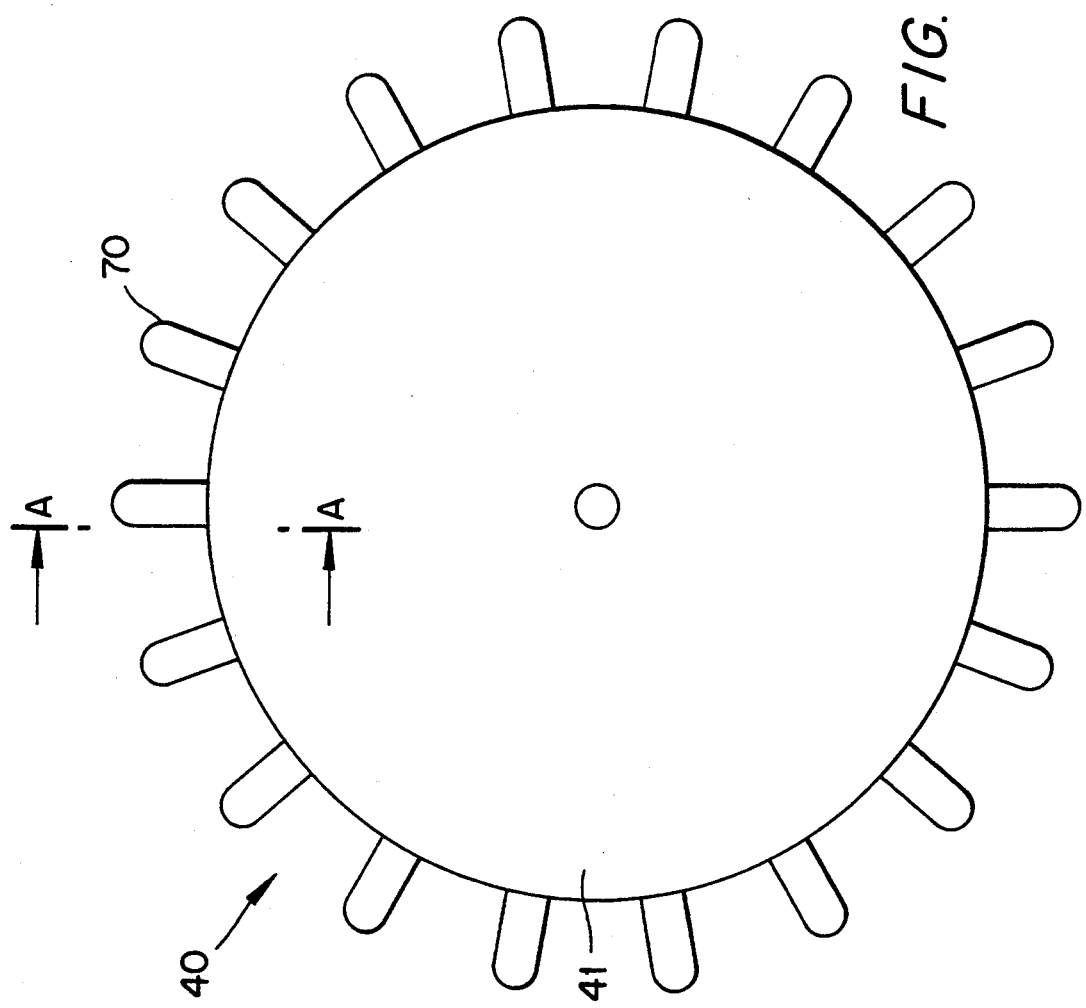

DYE STORAGE AND INTRODUCTION SYSTEM FOR CHANGING THE FREQUENCY OF A DYE LASER

BACKGROUND OF THE INVENTION

1. Field of the Invention

The present invention relates to dye lasers, and in particular, to dye lasers which permit selecting and changing of their output frequency.

2. State of the Art

Dye lasers typically include a lasing medium which circulates through a lasing cavity. The lasing medium in the lasing cavity is excited by an energy source, usually a laser. The lasing medium typically contains a dye which, when excited, radiates at a known frequency or in a known range of frequencies. The output frequency of the laser may be selected by selection of the dye or the concentration of the dye in the lasing medium. An advantageous feature of dye lasers is that the output frequency can be changed by changing the lasing medium.

Changing the lasing medium in the lasing cavity can be time consuming and inconvenient, because it involves removing all of the lasing medium containing the old dye from the laser and replacing it with lasing medium containing the new dye.

Various solutions have been proposed. For example, U.S. Pat. No. 3,745,484 to Caristi discloses a dye laser apparatus having a removable dye module 80 which contains a selected dye solution. U.S. Pat. No. 3,846,715 to Yarborough discloses a dye laser having a plurality of dye reservoirs and circulating systems. A turret assembly provides a means for selecting a dye system and introducing the liquid of that dye system into the laser optical cavity. U.S. Pat. No. 3,868,591 to Mumola et al. discloses a plurality of optical cavities, each supplied with a different lasing fluid, which may be optically pumped by a single light source. U.S. Pat. No. 4,404,679 Chiu et al. discloses a removable sealed dye cell holder. U.S. Pat. No. 4,710,937 to Oomori et al. discloses a dye laser system having a plurality of laser dye vessels each containing a different dye solution which may be optically pumped simultaneously to emit laser beams of different wavelengths.

The lasers described above have disadvantages and limitations which make the selection of a different output frequency difficult or inconvenient. In each of the laser systems mentioned, the stored, or alternative, lasing fluids have the dyes in solution. Once in solution, however, a laser dye degrades, whether the dye is being excited to produce an emission or simply held in storage. Therefore, once prepared, each of the foregoing systems has a limited useful life before refreshing or replacing the lasing medium becomes necessary.

The Yarborough, Mumola, and Oomori patents require different dye vessels or containers for each dye change. This limits the number of dyes which may be contained in the system because of size and other physical constraints, such as coupling each of the various fluid systems to the lasing cavity. As a result, such systems are limited in the range of choices in selecting a dye, and, therefore, the resulting output frequency.

The Caristi and Chiu patents disclose changeable liquid dye cells, which provide the capability for a wide range of dye changes, but are disadvantaged in not being self-contained systems. The user must have on hand a separate dye module or cell for each dye change desired, which can be inconvenient if the laser is to be used in the field.

SUMMARY OF THE PRESENT INVENTION

The present invention, generally, overcomes the disadvantages of the prior art by providing a dye laser having a self-contained system for changing the output frequency of the laser. The present invention also provides a method for changing the output frequency of a laser.

The present invention provides a laser having a self-contained frequency changing system capable of a large number of frequency changes before the system is exhausted and must be refreshed.

The present invention further provides a dye laser having a changeable frequency for use under a wide range of temperature and pressure conditions.

The present invention also provides a laser having a system for changing the output frequency of the laser that remains operable over an extended time without dye degradation or deterioration.

The laser system of the present invention includes a means for removing a dye from a liquid lasing medium without removing the liquid from the laser, and selecting and adding a different dye into the solution. The system of the present invention allows the dye concentration and volume of the solution to be precisely controlled.

More particularly, the present invention provides a dye laser having a lasing cavity through which a lasing fluid medium is circulated. A reservoir for containing the fluid is connected to the cavity by means of a fluid circuit. The reservoir is provided with a means for selecting and introducing a dye into the fluid. A means for removing a dye from the fluid is provided in a second fluid circuit parallel to the operational circuit. A two-position valve is provided for selecting which of the circuits is active.

The present invention also provides a means for selecting and injecting a dye into the lasing fluid which includes a plurality of containers carried in the lasing fluid, each containing a dye and which may be selected and introduced into the lasing solution. The dye may be in solid form or as a concentrated liquid. The dye containers are preferably glass ampules, hermetically sealed to prevent contamination and deterioration of the dye. The ampules may be broken by a striking force applied to the glass to cause the dye to enter into solution. In a preferred embodiment of the present invention, the glass ampules are carried on a rotatable wheel which is immersed in the reservoir. By means of a stepper motor, the wheel may be rotated to a selected position, which aligns an ampule with the rod of a striker solenoid. Activation of the solenoid causes the rod to strike and break the glass ampule, thus allowing the dye within to enter the solution.

The laser of the present invention includes a first fluid circuit for circulation lasing fluid between the reservoir and the lasing cavity. An expansion bellows acts on the loop to maintain a desired internal system pressure under various external temperature and pressure conditions. A second fluid circuit circulates fluid through a scrubber means to remove dye from solution. A solenoid controlled valve controls which circuit is activated.

BRIEF DESCRIPTION OF THE DRAWINGS

The present invention can be further understood with reference to the following description in conjunction with the appended drawings, wherein like elements are provided with the same reference numerals. In the drawings:

FIG. 3 is a plan view of an ampule wheel of the embodiment of FIG. 1; and,

FIG. 4 is a partial sectional view of an ampule wheel of the embodiment of FIG. 3, taken along line A—A of FIG. 3.

DETAILED DESCRIPTION OF THE PREFERRED EMBODIMENTS

Figure 1:
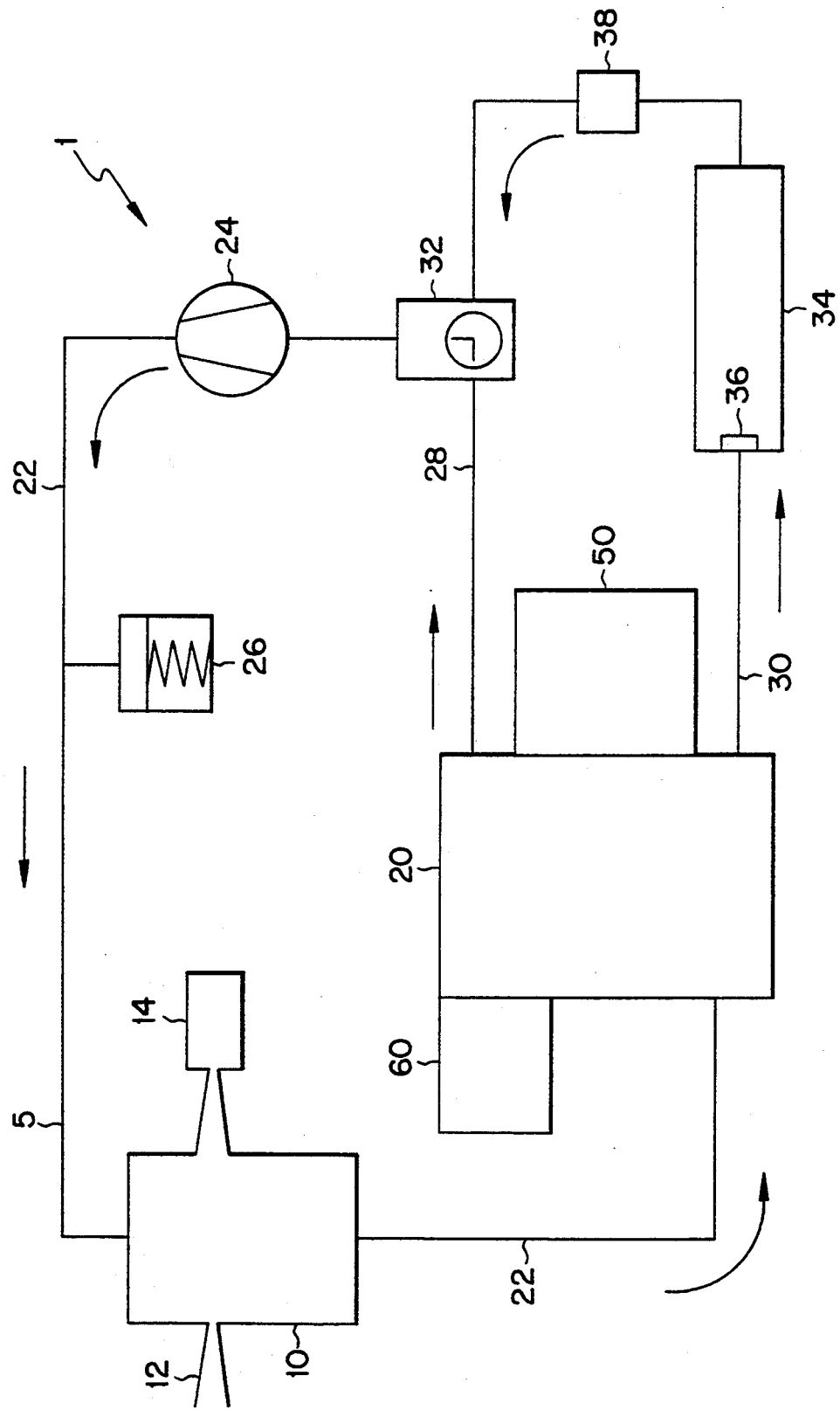
FIG. 1 is a schematic diagram of a laser according to a presently preferred embodiment of the present invention.

FIG. 1 is a schematic diagram of a laser of a presently preferred embodiment of the present invention. Generally, the laser 1 of the present invention comprises an optical resonator cavity 10, a means for circulating a lasing medium 5 through the cavity, and an energy source 14 to excite the lasing medium.

The optical resonator cavity 10 in a preferred embodiment presently contemplated is of the type including optical means (not shown) as is known in the art for producing a laser output beam 12. The optical resonator cavity 10 typically includes two lenses arranged with a space between them through which a laser medium is circulated. The particular optical means employed, however, is not important to the invention, and any suitable optical means may be incorporated in the resonator cavity.

A fluid lasing medium 5 containing a laser dye in solution is circulated through the cavity 10. The lasing medium 5 preferably includes a solvent such as methanol or ethanol in which a laser dye is dissolved. An energy source 14 stimulates the lasing fluid in the cavity 10 causing the dye in the lasing fluid 5 to emit light, which resonates in the cavity to produce the output laser beam 12. The energy source 14 in a preferred embodiment of the present invention is a laser, referred to in the art as a pump laser.

A reservoir 20 contains the lasing fluid 5. The reservoir 20 is connected to the cavity 10 by a fluid circuit 22 which conveys the lasing fluid 5 from the reservoir to the cavity and returns it to the reservoir. A pump 24 is interposed in the circuit 22 for pumping the lasing fluid 5 through the system. The pump 24 is any conventional pump suitable for use in a dye laser. The circulation direction of the fluid through the system is generally indicated by the arrows.

An expansion bellows 26 is provided for maintaining a desired operating pressure in the lasing fluid 5. The bellows 26 is located to communicate with the circuit 22 and applies pressure to the fluid 5. The bellows 26 maintains a substantially constant positive pressure, that is, pressure above ambient, in the system over a broad range of ambient temperature conditions. By maintaining positive pressure on the system, the effects of changes in volume due to temperature are minimized or eliminated, thus enabling the laser to operate with desired flow characteristics under a wide range of ambient conditions.

The laser 1 of the present invention is provided with a means for removing dye from the lasing solution 5. In a preferred embodiment as shown in FIG. 1, the fluid circuit 22 is provided with means for selectively circulating the lasing fluid 5 through a dye removal means 34. The fluid circuit 22 is therefore provided with a first leg 28 for circulating the lasing fluid 5 in a normal operating mode and a second leg 30 for circulating the fluid through dye removal means 34, for dye removal, or scrub, mode. A three port, two-position valve 32 controls which of the legs 28, 30 is in communication with the fluid circuit 22 for circulation of the lasing fluid 5.

The first leg 28 connects the reservoir 20 directly to the valve 32. The second leg 30 also connects the reservoir 20 to the valve 32, in parallel with the first leg 28, but through the interposed dye removing means 34. The valve 32 allows only one of the legs 28, 30 to communicate with the fluid circuit 22, shutting the other leg off from flow. In a preferred embodiment of the present invention, the valve 32 is a solenoid-controlled valve that, in an inactivated condition, connects the first leg 28 to the fluid circuit 22. When energized, the valve 32 switches to open the second leg 30 to the fluid circuit 22. Of course, other conventional means could be used to control the valve 32. The valve 32 is controlled by any suitable control means (not shown) for switching between positions.

The dye removal means 34, or scrubber, is provided for removing, or scrubbing, dye from the lasing fluid 5. The scrubber 34 is interposed on the second leg 30 and functions when the second leg is activated by the valve 32 and lasing fluid 5 is circulated through the second leg. The scrubber 34 may be comprised of an activated charcoal filter; however, any other appropriate filter means could be used.

In a presently preferred embodiment of the invention, the structural parts of the laser are constructed of stainless steel to provide corrosion resistance and long life under a wide range of environmental conditions and for extended periods. The structural parts include the various housings for the elements of the laser and those parts in contact with fluids and the external environment, and include at least the lasing cavity 10, reservoir 20, fluid circuit 22 and first and second legs 28, 30.

For scrub mode operation, the valve 32 is activated to switch circulation through the second leg 30 and, thus the scrubber 32. Scrub mode continues until substantially all of the dye in the lasing fluid 5 is removed. The scrubber 32 is provided with a check valve 36 to prevent dye from leaking back into the reservoir 20 when the valve 32 closes the second leg 30 and operational circulation mode begins again.

In a preferred embodiment of the invention, means 38 is provided for determining when the scrub mode has sufficiently cleaned the dye from the lasing fluid 5. This means 38 may be any suitable system, and in a preferred embodiment is a paired optical sensor and receptor placed across the fluid stream in the circuit 22 for sensing when the fluid 5 is clean. The sensor 38 may be placed immediately downstream of the scrubber 34, as shown in FIG. 1. It is noted that the sensor 38 is not critical to the operation of the invention and may be omitted. Scrub mode may alternatively be operated for a predetermined period of time which will allow the scrubber 34 sufficient time to clean the fluid 5.

When the fluid 5 is clean, which may be after scrub mode, or upon initial use of the laser 1, a dye may be selected and introduced into the lasing fluid 5. In a preferred embodiment of the present invention as described herein, the dye selection and injection means is incorporated with the reservoir 20.

Figure 2:
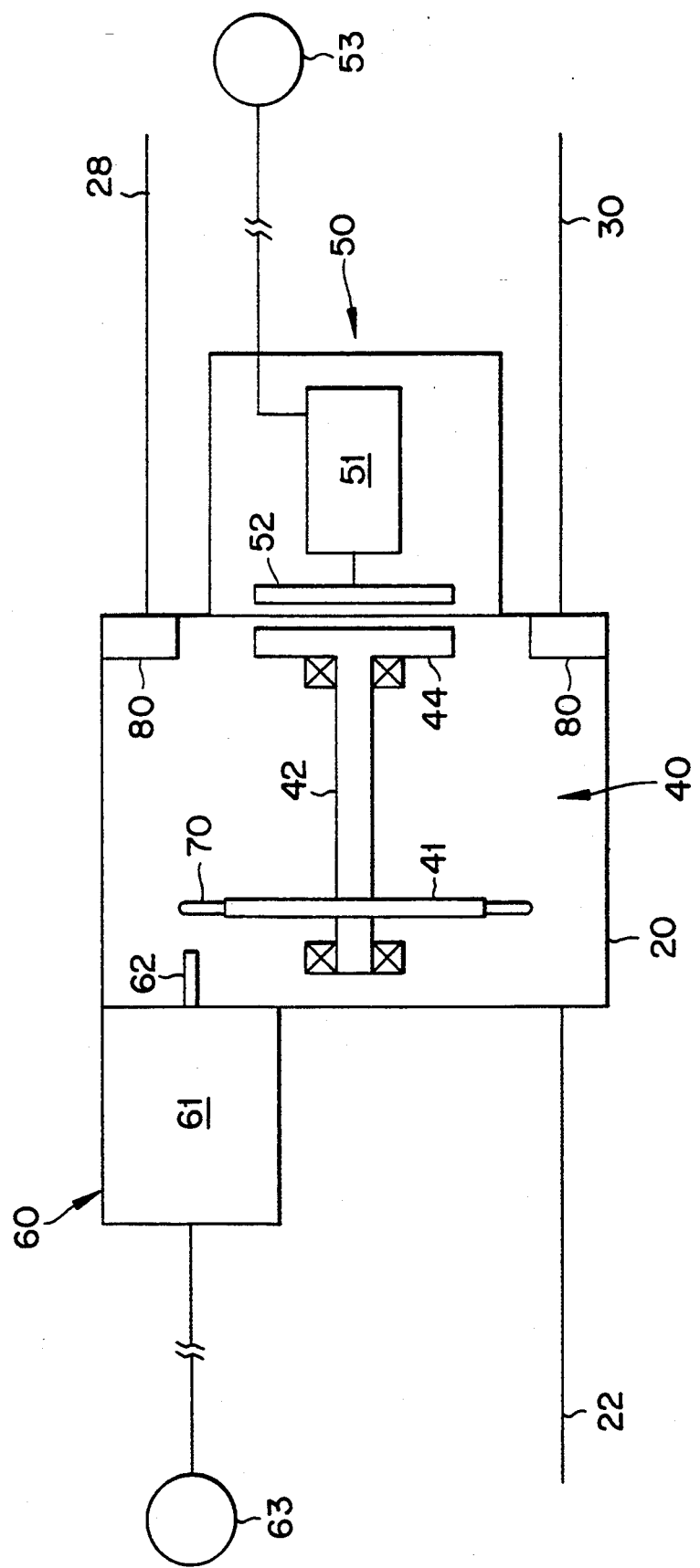
FIG. 2 is a schematic diagram of a reservoir and dye selection system of the embodiment of FIG. 1.

FIG. 2 is schematic diagram of the reservoir 20 and dye selection means of the present invention. The dye selection means comprises dye storage means 40 for storing a plurality of dyes, selecting means 50 for selecting one of the dyes for use in the laser, and dye injection means 60 for introducing the selected dye into the lasing fluid 5.

In a preferred embodiment of the invention as illustrated in FIG. 2, the dye storage means 40 comprises a wheel 41 rotatably mounted in the reservoir 20. A plurality of individual dye holders 70 are carried on the periphery of the wheel 41. Each of the dye holders 70 contains a single dye 72. In a preferred embodiment, the dye is a solid form, however, concentrated liquid dye may also be used. The dyes 72 may be prepared and installed in the laser 1 for the particular application for which the laser is to be used. The laser 1 of the present invention may advantageously be provided with the self-contained capability of a wide range of frequency choices and a plurality of frequency changes. The ampules 70 may thus each contain a different dye and/or a different concentration of a dye to provide the laser 1 the ability to produce selectively one of a number of different frequencies. Alternatively, the ampules 70 may each contain the same dye, or a selected number of ampules may contain the same dye, thus providing the laser 1 the ability to repeat a particular frequency after the dye has deteriorated through use.

FIG. 3 is a front view of the dye holder wheel 41 of the present invention. The individual dye holders 70 are arranged on the periphery of the wheel 41 and extend radially from the wheel. In a preferred embodiment of the invention, the dye holders 70 are glass ampules. Each ampule 70 contains a pre-determined, precisely measured amount of laser dye in solid form 72.

The environmental conditions under which the ampules 70, and the laser, are designed to operate include a temperature range of $-65°$ F. to $160°$ F., and a pressure of about 30 psig. After filling with a selected dye, the glass ampules 70 are sealed by heating the end of the ampule to close the glass. The ampules 70 are hermetically sealed to a maximum leakage rate of $10^{-9}$ sccs (standard cubic centimeters/second) He, to prevent contamination and deterioration of the dyes. The ampules 70 in this form have a storage life of several years.

Although FIG. 3 shows a certain number of ampules 70 arranged on the wheel 41, this is understood to be illustrative and not limiting of the embodiment. The number of ampules 70 provided on the wheel 41 is determined by the particular application for the laser 1, that is, the variety of dyes, and the number of dye changes anticipated for use before the system must be refreshed.

FIG. 4 is a partial sectional view of the wheel 41 taken along line A—A of FIG. 3. In the embodiment as shown in FIG. 4, the ampules 70 are generally oblong-shaped, thin-walled vessels. The ampules 70 are securely mounted in the wheel 41 with a portion extending radially from the peripheral edge of the wheel.

Referring again to FIG. 2, the wheel 41 is mounted on a shaft 42 carried in the reservoir 20. The dye selecting means 50 is provided to place a selected dye ampule 70 in position for use in the laser 1. In a preferred embodiment of the invention, the selecting means 50 comprises a stepper motor 51 which rotates the wheel 41 to a desired position. The motor 51 is mounted on the reservoir 20 and is coupled to the shaft 42 through a magnetic coupler 52 which drives a magnetic follower 44 on the shaft. The motor is controlled by a control means 53, which is electrically connected to the motor and conveniently located to provide a means for a user of the laser to operate the selecting means. The control means 53 may be any suitable means compatible with the stepper motor 51 of the present invention.

The dye injection means 60 is provided for introducing the selected dye into the lasing fluid 5. In a preferred embodiment of the invention, the injection means 60 comprises a solenoid 61 having a striker rod 62. The solenoid 61 is mounted to the side of the reservoir 20 and is positioned so that the striker rod 62 extends into the reservoir. The end of the striker rod 62 is positioned adjacent to the end of a glass ampule 70 which has been rotated into position by the selection means 50. Upon activation of the solenoid 61, the striker rod 62 is forcibly extended and strikes through the exposed portion of the ampule 70, breaking the glass and releasing the dye 72 into the solution 5 in the reservoir 20. In a preferred embodiment of the invention, the ampules 70 are designed to break when struck by a striker rod 0.062 inches in diameter with a force of 30 pounds applied in 20 to 50 msec. A control means 63 is provided to allow a user of the laser 1 to activate the solenoid 61 when it is desired to introduce a dye into the laser fluid 5. The control means 63 is located so that it may be conveniently used by the user of the laser.

As shown in FIG. 2, the fluid circuit 22 enters the reservoir 20, and first leg 28 and second leg 30 exit the reservoir. At each of the ports for the first 28 and second 30 legs, a screen 80 is provided to prevent broken glass from the ampules 70 from entering the circulation circuit 22.

The dye 72 released in this manner dissolves in the solution 5 to form the new lasing fluid. Because each ampule 70 contains a precisely measured amount of dye 72, forming the lasing fluid in this manner is highly reliable. The solid or highly concentrated liquid dye 72 does not add appreciable volume to the solution 5, so the concentration of the solution may be precisely determined. In addition, in the case of solid dye 72 which can be stored in the glass ampules 70 for an extended time without degradation, the strength of the lasing fluid to be made up remains predictable.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. An apparatus for storing and injecting a dye in a dye laser, comprising:
   means for introducing a liquid lasing medium into a dye laser;
   means in communication with said introducing means for selectively adding one of a plurality of laser dyes into the lasing medium, said adding means including a plurality of hermetically sealed glass ampules, each ampule releasably containing one of the plurality of laser dyes; and, means in communication with said introducing means for removing an added dye from the lasing medium.

2. The apparatus as claimed in claim 1, wherein the dyes are in solid form.

3. The apparatus as claimed in claim 1, wherein the dyes are in concentrated liquid form.

4. The apparatus as claimed in claim 1, wherein the means for selectively adding a dye includes means for selectively releasing a dye from one of the ampules into the lasing medium.

5. The apparatus as claimed in claim 4, wherein the plurality of ampules are arranged on a wheel in fluid communication with the circulation means and the means for selectively introducing a dye includes means for rotating the wheel to place an ampule in a desired position for releasing a dye from the positioned ampule.

6. The apparatus as claimed in claim 5, wherein the means for rotating the wheel is a stepper motor.

7. The apparatus as claimed in claim 5, wherein the means for selectively introducing a dye further includes means for opening a selected ampule.

8. The apparatus as claimed in claim 7, wherein the means for releasing the dye from the ampule is a striker rod activated by a solenoid for breaking the glass ampule.

9. The apparatus as claimed in claim 1, wherein the means for removing the dye from the lasing medium includes filtering means through which the lasing medium can be selectively circulated.

10. The apparatus as claimed in claim 1, wherein the means for introducing the lasing medium into the laser includes a reservoir for containing the lasing medium, said reservoir in fluid communication with a circulation circuit, and a pump for circulating the medium.

11. The apparatus as claimed in claim 10, wherein the circulation circuit includes a first leg for circulating the lasing medium in an operational mode and a second leg for circulating the lasing medium in a dye removal mode.

12. The apparatus as claimed in claim 11, wherein a valve is provided for selectively controlling which of the first and second legs are connected in the circulation circuit.

13. The apparatus as claimed in claim 12, wherein dye removal means is provided in the second leg.

14. The apparatus as claimed in claim 10, wherein the means for storing the solid laser dyes is arranged in the reservoir.

15. The apparatus as claimed in claim 1, further comprising a means for maintaining a predetermined pressure in the lasing medium circulating in the laser.

16. A dye laser having selectable and changeable output frequency, comprising:
   a lasing cavity;
   means in fluid communication with said lasing cavity for circulating a fluid lasing medium through the lasing cavity;
   means optically coupled to said lasing cavity for exciting the lasing medium in the lasing cavity;
   means in fluid communication with said lasing cavity for selectively adding one of a plurality of dyes into the lasing medium, said adding means including a plurality of ampules carried on a rotatable wheel in a reservoir for separately storing said plurality of laser dyes, the reservoir communicating with the means for circulating the lasing medium; and,
   means in fluid communication with said lasing cavity for removing a dye from the lasing medium.

17. The apparatus as claimed in claim 16, wherein the means for selectively introducing a dye into the lasing medium includes means for rotating the wheel to position a selected ampule adjacent to a means for releasing the dye from the ampule, and means to control the releasing means.

18. The apparatus as claimed in claim 16, wherein the means for removing dye includes a filter which may be a selectively operated in the circulation means.

19. A dye laser, comprising:
   an optical lasing cavity;
   a reservoir for containing a liquid lasing medium;
   a first flow circuit connecting the reservoir to the cavity for circulation of the lasing medium therebetween;
   a pump interposed on the first flow circuit for circulating the lasing medium;
   a bellows acting on the first flow circuit for maintaining a predetermined pressure of the medium;
   a plurality of laser dyes, each dye contained in a hermetically sealed glass ampule;
   a wheel, mounted on a shaft carried in the reservoir, for carrying each of the ampules on a periphery of the wheel in a predetermined position;
   a stepper motor for rotating the wheel to a desired position, the stepper motor magnetically coupled to the shaft carrying the wheel;
   a solenoid having a striker rod, said rod extending into the reservoir and positioned so that activation of the solenoid extends the striker rod for striking and breaking a selected ampule rotated into a striking position in relation to the striker rod;
   a scrubber for removing dye from the medium;
   a second flow circuit connecting the reservoir to the scrubber for circulation therebetween;
   a valve for selectively connecting one of the first and second flow circuits to the pump; and
   a laser for optically exciting the lasing medium in the lasing cavity.

20. A method for storing and introducing a dye in a dye laser for changing an output frequency of the laser, comprising the steps of:
   storing a plurality of laser dyes in individual hermetically sealed glass ampules, each ampule containing a single laser dye, the ampules being in fluid communication with a laser solvent in a dye laser;
   introducing selectively one of said plurality of laser dyes into the lasing medium, the laser dye being selected for producing a selected output frequency in the laser;
   allowing the laser dye to dissolve in the laser solvent to form a lasing medium; and,
   removing selectively the introduced dye from the lasing medium prior to selecting a substitute dye to change the output frequency of the laser.

21. The method as claimed in claim 20, wherein removing the dye from the lasing medium includes circulating the lasing medium through a filtering unit.

22. The method as claimed in claim 20, wherein storing a plurality of laser dyes comprises providing a plurality of individual containers in the form of hermetically sealed glass ampules, each containing a single laser dye, and positioning each ampule in fluid communication with the laser solvent.

23. The method as claimed in claim 22, wherein selectively introducing a dye includes selecting an ampule from the plurality of ampules and breaking the selected ampule to release the dye into the laser solvent.

24. The method as claimed in claim 23, wherein the step of selecting an ampule includes positioning an ampule adjacent to means for breaking the ampule.

* * * * *